United States Patent
Guidolin et al.

(10) Patent No.: US 9,427,695 B2
(45) Date of Patent: Aug. 30, 2016

(54) CARBON DIOXIDE CAPTURE SYSTEM

(75) Inventors: Sandra Guidolin, Belfort (FR); Joseph P. Naumovitz, Lebanon, NJ (US); Peter Kniesburges, Wiesbaden (DE)

(73) Assignee: ALSTOM Technology Ltd, Baden (CH)

( * ) Notice: Subject to any disclaimer, the term of this patent is extended or adjusted under 35 U.S.C. 154(b) by 1040 days.

(21) Appl. No.: 13/438,392

(22) Filed: Apr. 3, 2012

(65) Prior Publication Data

US 2012/0258031 A1 Oct. 11, 2012

Related U.S. Application Data

(60) Provisional application No. 61/472,409, filed on Apr. 6, 2011.

(51) Int. Cl.
*B01D 53/62* (2006.01)
*B01D 53/14* (2006.01)
*B01D 53/78* (2006.01)
*B01D 53/96* (2006.01)

(52) U.S. Cl.
CPC ....... *B01D 53/1406* (2013.01); *B01D 53/1475* (2013.01); *B01D 53/62* (2013.01); *B01D 2252/102* (2013.01); *B01D 2257/504* (2013.01); *B01D 2258/0283* (2013.01); *Y02C 10/04* (2013.01); *Y02C 10/06* (2013.01)

(58) Field of Classification Search
None
See application file for complete search history.

(56) References Cited

U.S. PATENT DOCUMENTS

| | | | |
|---|---|---|---|
| 2,878,099 A | 3/1959 | Breuing et al. | |
| 4,847,057 A | 7/1989 | Brugerolle et al. | |
| 6,772,821 B1 | 8/2004 | Fulton et al. | |
| 7,377,967 B2* | 5/2008 | Reddy et al. | 96/242 |
| 7,846,240 B2 | 12/2010 | Gal et al. | |
| 2008/0307968 A1 | 12/2008 | Kang et al. | |
| 2013/0269525 A1* | 10/2013 | Alix et al. | 95/159 |

FOREIGN PATENT DOCUMENTS

| | | |
|---|---|---|
| EP | 2 014 347 | 1/2009 |
| FR | 1 157 455 | 5/1958 |
| FR | 2108958 A1 | 5/1972 |
| WO | 2009/055419 A1 | 4/2009 |
| WO | 2010/020017 | 2/2010 |

OTHER PUBLICATIONS

Chinese Office Action issued by SIPO, dated Dec. 1, 2014 for CN Appln. No. 201280027538.0.

* cited by examiner

*Primary Examiner* — Daniel Berns
(74) *Attorney, Agent, or Firm* — Cynthia W. Flanigan

(57) ABSTRACT

A chilled ammonia capture system for capturing carbon dioxide from a flue gas stream comprises a first absorber and a second absorber. The first absorber operates at a temperature of about 25 to about 50 degrees Celsius. The operating temperature permits the use of a lower circulation rate, which leads to smaller diameter vessels and to fewer recirculation pumps, which in turn leads to lower operating and maintenance costs.

10 Claims, 5 Drawing Sheets

CARBON DIOXIDE CAPTURE SYSTEM

CROSS REFERENCE TO RELATED APPLICATIONS

This disclosure claims priority to U.S. Provisional Application No. 61/472,409 filed on Apr. 6, 2011, the entire contents of which are hereby incorporated by reference.

TECHNICAL FIELD

This disclosure relates to a carbon dioxide capture system and to its method of usage. In particular, this disclosure relates to a chilled ammonia carbon dioxide capture system and to its method of usage.

BACKGROUND

Power generation systems generally combust hydrocarbon based fuels in order to generate energy. Such systems generally produce an end product that comprises primarily carbon dioxide and water (e.g., steam) as by-products of the energy generation process. In most cases, the stream will include varying amounts of nitrogen, oxygen, sulfur dioxide and other compounds.

Environmental pollution stemming from fossil-fueled power plants is of worldwide concern. Power plants emit air pollutants that may be toxic, e.g., toxic metals and polyaromatic hydrocarbons; precursors to acid rain, e.g., sulfur oxides ($SO_x$) such as sulfur dioxide ($SO_2$), and nitrogen oxides ($NO_x$); precursors to ozone such as $NO_2$ and reactive organic gases; particulate matter; and greenhouse gases, notably $CO_2$. Power plants also discharge potentially harmful effluents into surface and ground water, and generate considerable amounts of solid wastes, some of which may be hazardous.

Although technologies are being developed that reduce emissions and effluents, they are often expensive and require considerable energy. Technologies have been developed and are installed on most new power plants that significantly reduce emissions of $NO_x$, $SO_2$ and particulates. However, $CO_2$ remains the one emission that is currently not controlled.

Several technologies can be employed to remove $CO_2$ from flue gases. These technologies include post combustion chemical scrubbing (such as amine scrubbing), oxygen fired combustion and chilled ammonia processes. Chemical scrubbing and oxygen fired combustion add capital cost to the plant and increase the cost of plant operation. The result is a significant increase in the cost of generated electricity.

Chilled ammonia processing (CAP) based systems provide a relatively low cost means for capturing and removing carbon dioxide from a gas stream, such as, for example, a post combustion flue gas stream.

U.S. Pat. No. 7,846,240 to Gal is directed to a chilled ammonia processing system and a method for capturing and removing carbon dioxide from a flue gas stream. Gal teaches a system that contains two absorbers, a wash vessel and a regenerator. The process however operates at low temperatures below 20° C., which causes the reaction between ammonia solutions and water to be slower. The slower reaction rate causes the use of larger vessels with attendant increased costs. The lower temperature also causes lower circulation rates, which leads to slower processes. It is therefore desirable to develop a chilled ammonia process that can operate at temperatures that facilitate a more rapid process with lower process costs and equipment of a reduced size as compared with that disclosed by Gal.

SUMMARY

Disclosed herein is a method comprising contacting a flue gas stream with an ammoniated solution within a first absorber; wherein the first absorber operates at a temperature of about 25 to about 50 degrees Celsius; the ammoniated solution being operative to remove carbon dioxide from the flue gas stream to form a liquid stream that comprises ammonia and about 2 to about 31 weight percent carbon dioxide, based on the total weight of the liquid stream and a gaseous stream that comprises about 3 to about 8 wt % gaseous ammonia and about 2 to about 5 wt % carbon dioxide; splitting the liquid stream into a first portion stream and a second portion stream; transporting the gaseous stream and the first portion stream to a second absorber; wherein the second absorber operates at a temperature of about 5 to about 35 degrees Celsius; the second absorber being operative to remove substantially all ammonia from the gaseous stream and the first portion stream; recycling ammonia from the second absorber to the first absorber; and transporting the second portion stream of the liquid stream to a regenerator to separate carbon dioxide from ammonia.

Disclosed herein too is a system comprising a first absorber, where the first absorber is operative to contact a carbon dioxide containing flue gas stream with an ammoniated solution to produce a carbon dioxide rich sol; where the first absorber comprises a plurality of stages that facilitate contact between carbon dioxide and ammonia; a first splitter disposed downstream of the first absorber; the first splitter being operative to split the carbon dioxide rich flue gas stream into a plurality of streams; a second absorber; where the second absorber is disposed downstream of the first absorber; the second absorber being operative to remove substantially all ammonia from at least one stream of the plurality of streams received from the first splitter.

DETAILED DESCRIPTION

Figure 1:
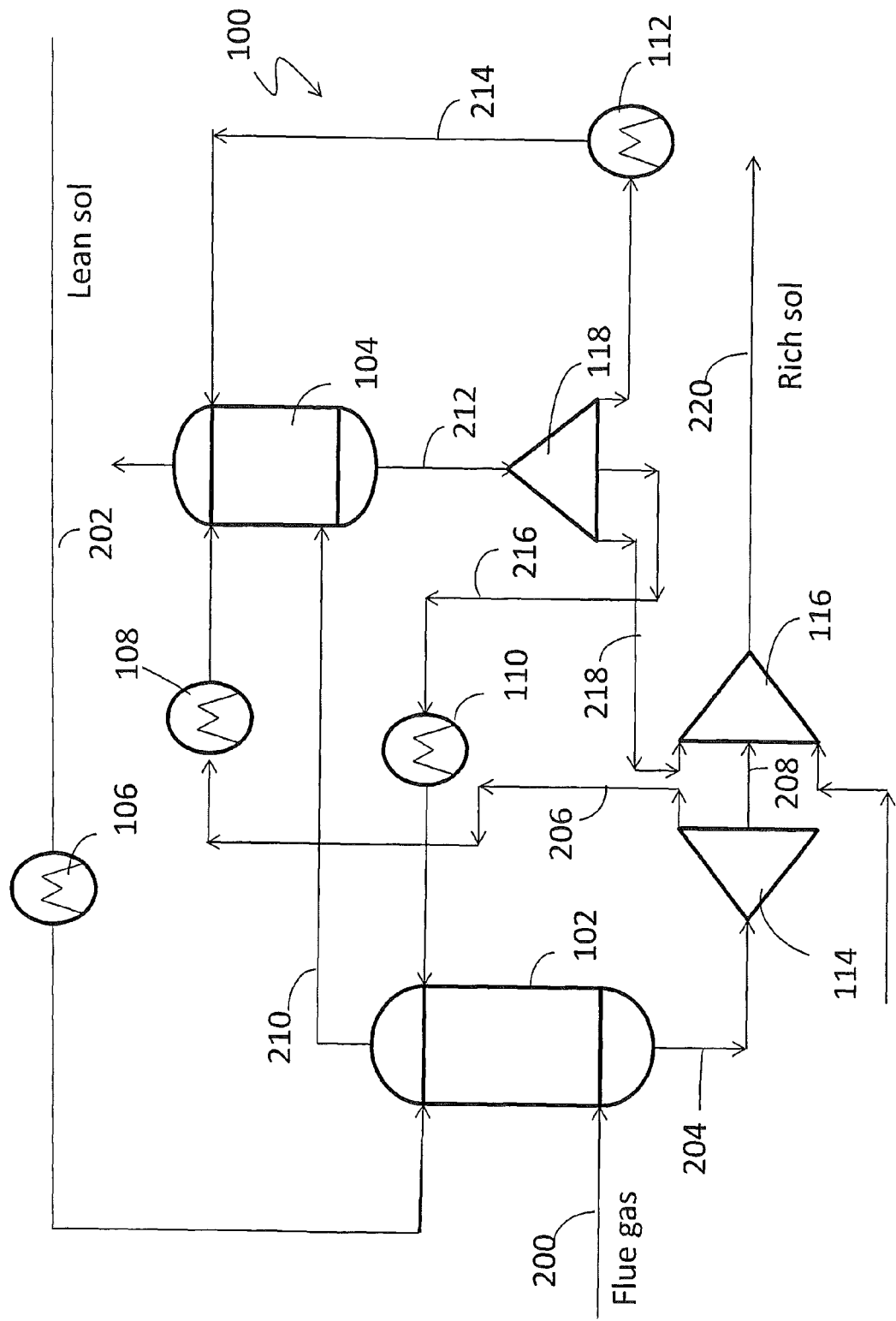
FIG. 1 is a depiction of an exemplary embodiment of the system that uses a chilled ammonia process for removing carbon dioxide from the flue gas stream.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The transition term "comprising" encompasses the transition terms "consisting essentially of" and "consisting of".

In addition, all numerical ranges are inclusive of the endpoints and the numbers within different ranges are interchangeable.

Disclosed herein is a chilled ammonia process that uses a higher temperature in the absorber to effect the absorption of carbon dioxide from the flue gas stream into an ammonia solution. The use of a higher temperature to effect the absorption of carbon dioxide results in the use of fewer absorbers. This use of a higher temperature is also advantageous in that it improves the efficiency of the absorption process thereby utilizing lower circulation rates, smaller vessels and less equipment, which results in cost savings and lower maintenance costs.

With reference now to the FIG. 1, a system 100 for absorbing carbon dioxide from a flue gas stream 200 of a power generation facility comprises a first absorber 102 in fluid communication with the power generation facility (not shown). The first absorber 102 lies downstream of the power generation facility and flue gases from the power generation facility are transported to the first absorber 102. The first absorber 102 functions to remove most of the carbon dioxide from the flue gas stream. Prior to reaching the first absorber 102, the flue gas stream 200 has particulate matter removed from them in a dust removal system (not shown) and a other chemicals such as NOx and SOx removed from them in a scrubber (not shown). The flue gas stream 200 enters the first absorber 102 where carbon dioxide presents in the flue gas stream 200 reacts with an ammonia solution and 202 to form ammonium carbonate, ammonium carbamate, and ammonium bicarbonate.

With reference once again to the FIG. 1, the first absorber 102 is in fluid communication with a second absorber 104 that is operative to receive a semi lean solution 206 of carbon dioxide dissolved in ammonia from the first absorber 102. The second absorber 104 lies downstream of the first absorber 102 and is in fluid communication with the first absorber 102. The first absorber 102 functions to separate carbon dioxide from the flue gas by facilitating a reaction with ammonia contained in an ammoniated solution. The second absorber functions to capture remaining carbon dioxide from the flue gas stream and to collect all ammonia so that it can be reused. In an exemplary embodiment, the second absorber 104 is used to facilitate bulk ammonia retention within the system 100. It is desirable to prevent any ammonia from escaping from the system 100.

The first absorber 102 is in fluid communication with a first splitter 114 and a blender 116, both of which lie downstream of the first absorber 102. The second absorber 104 is in fluid communication with a second splitter 118. The first absorber 102 and the second absorber 104 are in fluid communication with a regenerator (not shown). The regenerator is part of a recycle loop which includes the first absorber 102. An ammoniated solution 202 that contains substantially no carbon dioxide (also termed a "lean sol") is transported from the regenerator to the first absorber 102 where it absorbs carbon dioxide. The carbon dioxide rich sol (hereinafter termed a "rich sol") 220 is transported to the regenerator from the first absorber 102.

In one embodiment, in one method of operation of the system 100, the first absorber 102 facilitates the absorption of $CO_2$ from the flue gas stream 200 by contacting the flue gas stream with the ammoniated solution 202. The ammoniated solution 202 may include dissolved ammonia and $CO_2$ species in a water solution and may also include precipitated solids of ammonium bicarbonate. The ammoniated solution 202 is derived from the regenerator (not shown), where carbon dioxide has been separated from the rich sol. This will be described in greater detail later.

The ammoniated solution 202 introduced to first absorber 102 may be recycled and/or provided by the regenerator (not shown). In one embodiment, the ammoniated solution is introduced into the first absorber 102 via a first heat exchanger 106. The ammoniated solution obtained from the regenerator is at a temperature of about 30 to about 50 degrees Celsius. In an exemplary embodiment, the ammoniated solution obtained from the regenerator is at a temperature of about 40 degrees Celsius. The first heat exchanger 106 is used to reduce the temperature of the ammoniated solution to about 10 to about 20 degrees Celsius. In a exemplary embodiment, the first heat exchanger 106 is used to reduce the temperature of the ammoniated solution to about 17 degrees Celsius.

The ammoniated solution comprises about 4 to about 20 wt % ammonia and about 50 to about 94 weight percent water.

As seen in the FIG. 1, ammoniated solution 202 may be introduced to the first absorber 102 at a location in upper portion of the tower. In one embodiment, the ammoniated solution 202 is introduced to the first absorber 102 at the top of the first absorber 102. The flue gas stream 200 containing carbon dioxide is introduced into the first absorber 102 at the bottom. The ammoniated solution 202 and the flue gas stream 200 travel in opposing directions in the first absorber 102. In one embodiment, the ammoniated solution travels from top to bottom in the first absorber 102, while the flue gas stream 200 travels from the bottom to top in the first absorber 102. The counter flowing of the ammoniated solution 202 and the flue gas stream 200 increases contact between the carbon dioxide and the ammonia and increases the amount of carbon dioxide that reacts with ammonia.

The flue gas stream comprises about 4 to about 16 weight percent (wt %) carbon dioxide based upon the total weight of the flue gas stream.

The liquid ammoniated solution 202 is introduced into the first absorber 102 at a temperature greater than 20 degrees Celsius. In one embodiment, the first absorber 102 is operated at temperature of about 25 to about 50 degrees Celsius to facilitate the absorption of carbon dioxide from the flue gas stream 200. In another embodiment, the first absorber 102 is operated at temperature of about 30 to about 45 degrees Celsius to facilitate the absorption of carbon dioxide from the flue gas stream 200. In yet another embodiment, the first absorber 102 is operated at temperature of about 35 to about 42 degrees Celsius to facilitate the absorption of carbon dioxide from the flue gas stream 200.

The use of temperatures greater than 20° C. in the first absorber 102 promotes a quicker reaction between the ammoniated solution or solution 202 and the carbon dioxide in the flue gas stream 200. The first absorber 102 comprises a number of stages where the carbon dioxide reacts with ammonia. In one embodiment, the first absorber 102 comprises about 40 to about 70 stages. In another, embodiment, the first absorber comprises about 50 to about 60 stages. In an exemplary embodiment, the first absorber comprises about 55 stages.

Without being limited to theory, when the flue gas stream 200 is contacted with the ammoniated solution 202 in the first absorber 102 the carbon dioxide contained in the flue gas stream reacts to form a bicarbonate ion by reacting with water ($H_2O$) and with a hydroxyl ion ($OH^-$). These "capture reactions" (Reaction 1 through Reaction 9, shown below) are generally described as follows:

$$CO_2(g) \rightarrow CO_2(aq) \quad \text{(Reaction 1)}$$

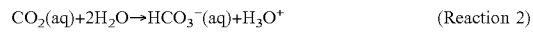
$$CO_2(aq) + 2H_2O \rightarrow HCO_3^-(aq) + H_3O^+ \quad \text{(Reaction 2)}$$

$$CO_2(aq) + OH^- \rightarrow HCO_3^-(aq) \quad \text{(Reaction 3)}$$

It is to be noted that when ammonia concentration is at 12 M the precipitation ratio can be slightly greater than 2.0 but when the ammonia concentration is at 2 M, the precipitation ratio can be as low as around 1.6. The reactions of the ammonia and its ions and carbon dioxide occur in the liquid phase and are discussed below. At temperatures of about 25 to about 50° C. and high ionic strength, of about 2 to about 12M ammonia ions, the bicarbonate produced in Reaction (2) and Reaction (3), reacts with ammonium ions and precipitates as ammonium bicarbonate when the ratio ammonia to carbon dioxide is smaller than 2.0 according to:

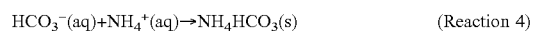
$$HCO_3^-(aq) + NH_4^+(aq) \rightarrow NH_4HCO_3(s) \quad \text{(Reaction 4)}$$

Reaction 2 is a slow reaction while Reaction 3 is a faster reaction. At high pH levels such as, for example when the pH is greater than 10, the concentration of $OH^-$ in the ionic solution is high and thus most of the carbon dioxide is captured through reaction (3) and high carbon dioxide capture efficiency can be achieved. At lower pH, the concentration of the hydroxyl ion $OH^-$ is low and the carbon dioxide capture efficiency is also low and is based mainly on reaction (2).

In the chilled ammonia based carbon dioxide capture system(s)/method(s) the carbon dioxide in the flue gas stream is captured by contacting the flue gas stream with an aqueous ammonia solution thus allowing the carbon dioxide in the flue gas stream to directly react with the aqueous ammonia. At pH values lower than 10, the direct reaction of carbon dioxide with ammonia contained in the ionic solution is the dominant mechanism for carbon dioxide capture. The first step in the carbon dioxide sequence capture is the carbon dioxide mass transfer from the gas phase to the liquid phase of reaction (1). In the liquid phase, a sequence of reactions occurs between the aqueous carbon dioxide and aqueous ammonia:

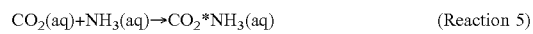
$$CO_2(aq) + NH_3(aq) \rightarrow CO_2*NH_3(aq) \quad \text{(Reaction 5)}$$

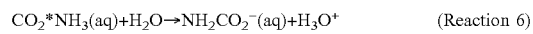
$$CO_2*NH_3(aq) + H_2O \rightarrow NH_2CO_2^-(aq) + H_3O^+ \quad \text{(Reaction 6)}$$

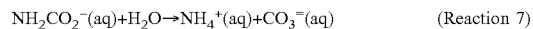
$$NH_2CO_2^-(aq) + H_2O \rightarrow NH_4^+(aq) + CO_3^=(aq) \quad \text{(Reaction 7)}$$

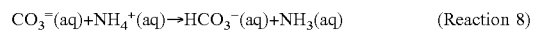
$$CO_3^=(aq) + NH_4^+(aq) \rightarrow HCO_3^-(aq) + NH_3(aq) \quad \text{(Reaction 8)}$$

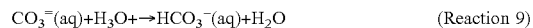
$$CO_3^=(aq) + H_3O^+ \rightarrow HCO_3^-(aq) + H_2O \quad \text{(Reaction 9)}$$

As described above, the bicarbonate produced in Reaction (8) and Reaction (9) can react with ammonium ions to precipitate as solid ammonium bicarbonate based on Reaction (4), while the ammonia produced in Reaction (8) can react with additional carbon dioxide based on Reaction (5).

The sequence of the chain of reactions (5) through (9) is increased by increasing the reaction temperature to above 20° C. By increasing the temperature of the first absorber 102 to 25 to 50° C., the capture reactions (5) through (9) are accelerated, the system 100 is able to capture more carbon dioxide from a flue gas stream per unit of time, thereby allowing for more carbon dioxide to be removed from a flue gas stream.

The first absorber 102 also comprises an interstage cooler (not shown). The interstage cooler serves to remove a portion of the ammoniated solution and carbon dioxide mixture from the first absorber 102 for cooling and to return it to the first absorber 102. The interstage cooler serves to reduce the temperature in the first absorber 102 to mitigate the effects of exothermic heat released as a result of the reaction between carbon dioxide and ammonia as well as allow for a higher carbon dioxide holding capacity within the ionic solution.

Figure 2:
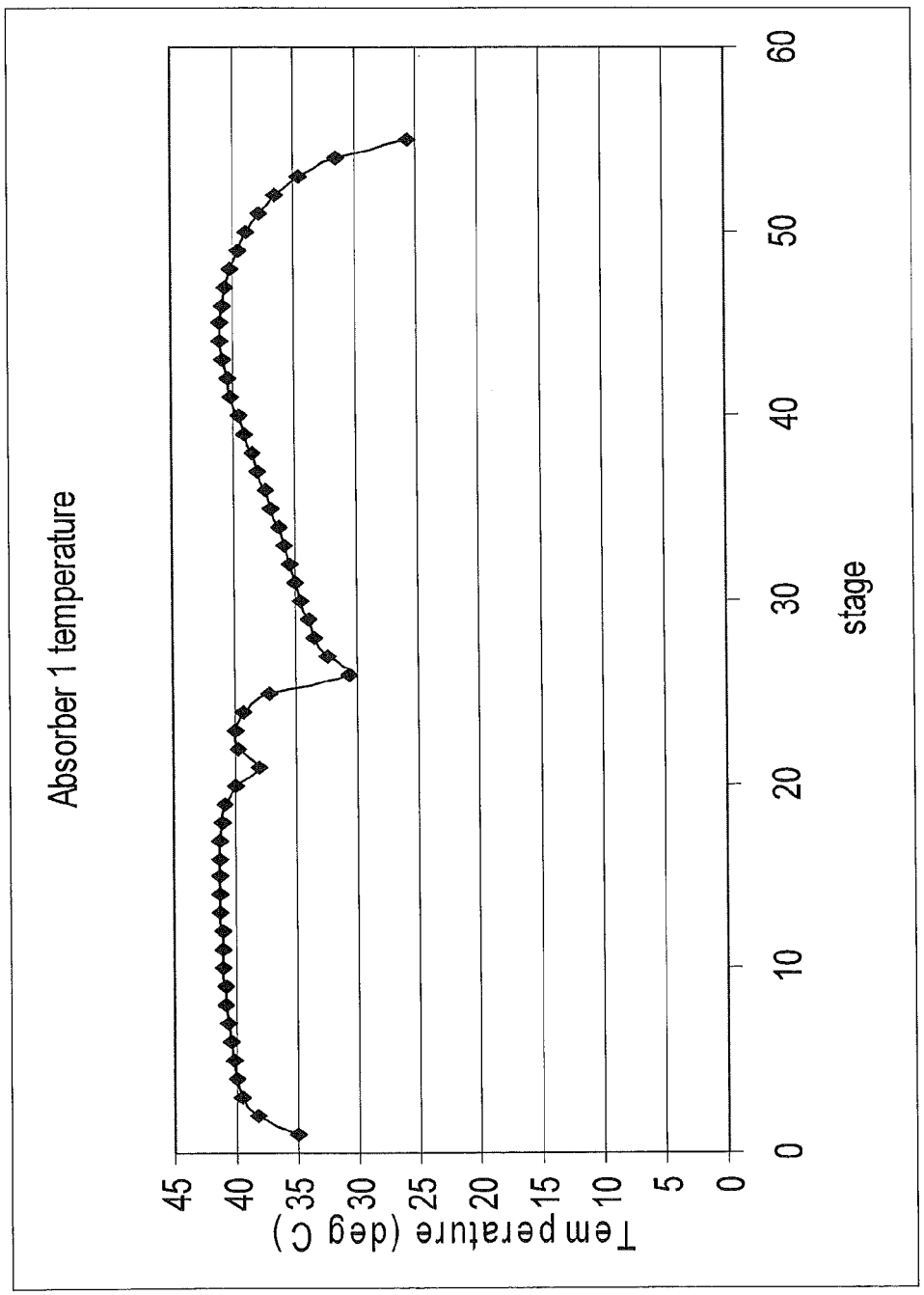
FIG. 2 is a graphical representation of the temperature profile of the first absorber.
Figure 3:
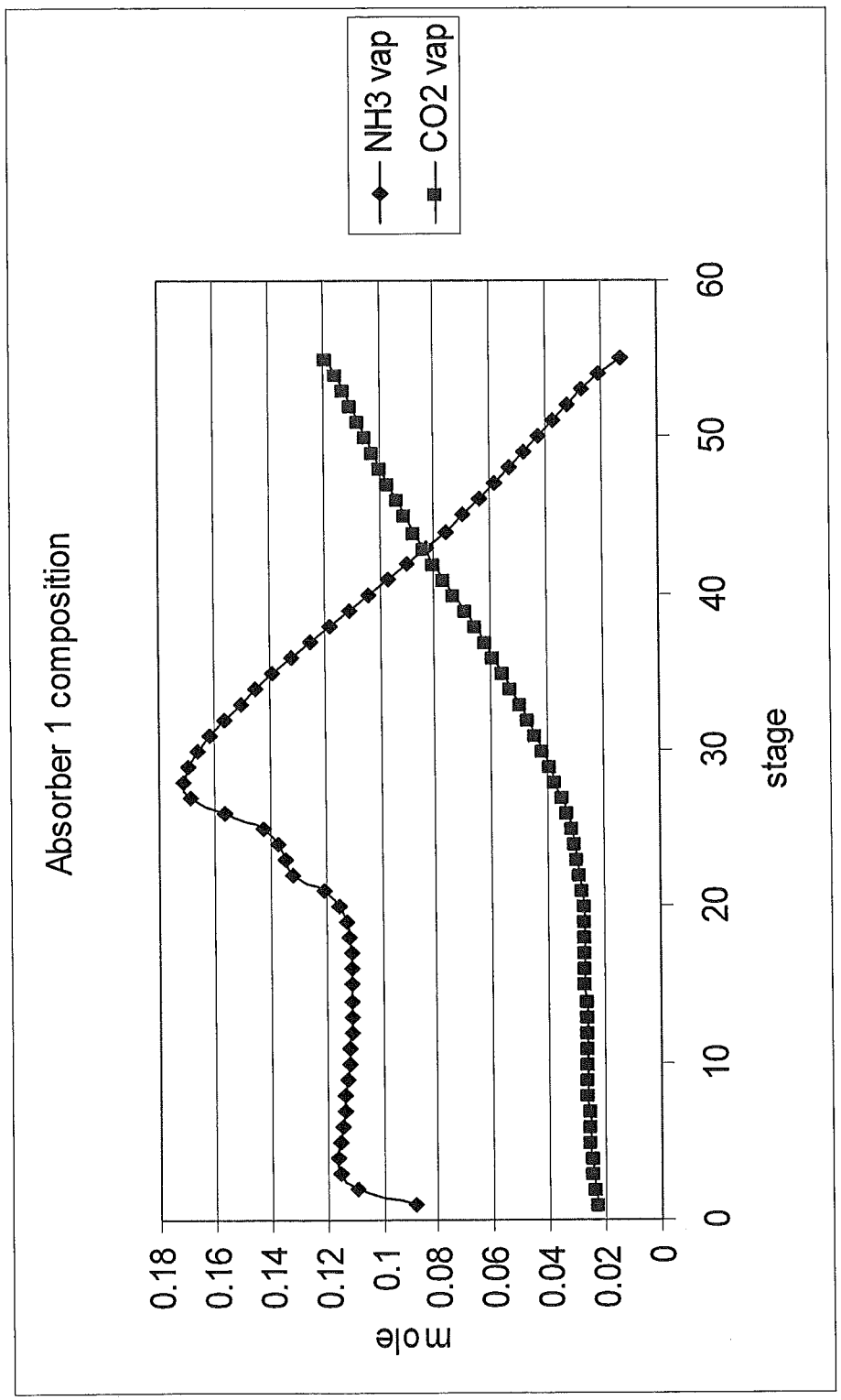
FIG. 3 is a graphical representation of the composition profile of the first absorber.

The FIG. 2 is a graphical representation of the temperature profile in the first absorber, while the FIG. 3 represents the composition of carbon dioxide and ammonia vapors respectively in the first absorber 102.

The FIG. 2 shows the temperature of the absorber relative to the number of stages in the first absorber 102. From the FIG. 2, it may be seen that the temperature at stage 1 (near the top of the first absorber 102) is about 35 degrees Celsius, while the temperature at stage 55 (near the bottom) is about 25 degrees Celsius. The temperature between stages 1 and 25 is about 35 to about 42 degrees Celsius, while at about stage 25, the temperature drops to 30 degrees Celsius because of the presence of the interstage cooler and the introduction of stream 202. The temperature between stages 26 and 45 increases from about 30 degrees Celsius to about 42 degrees Celsius prior to dropping to a temperature of about 25 degrees Celsius at stage 55 near the bottom.

From the FIG. 3, it may be seen that at stage 1 (near the top of the first absorber 102) there is very little carbon dioxide and a large amount of ammonia in vapor form, while at stage 55 (near the bottom of the absorber) there is a large amount of carbon dioxide and a very small amount of ammonia in the vapor form. The amount of ammonia in vapor form is highest around those stages that are proximate to the interstage cooler. The absorber composition as seen in the FIG. 3 indicates that about 10 wt % of carbon dioxide is removed from the flue gases and is now present in a liquid stream 204 that emanates from the bottom of the first absorber 102 (see FIG. 1).

The liquid stream 204 comprising carbon dioxide, ammonia and ammonium bicarbonate is removed from the bottom of the first absorber 102. The liquid stream 204 emanates from the first absorber 102 at a temperature of about 20 to about 30 degrees Celsius. In an exemplary embodiment, the liquid stream 204 emanates from the first absorber 102 at a temperature of about 26 degrees Celsius.

The liquid stream 204 emanating from the bottom of the first absorber is rich in carbon dioxide and comprises about 6 to about 31 wt % carbon dioxide, based on the weight of the liquid stream 204.

The liquid stream 204 is split into two additional streams—a first portion stream 206 and a second portion stream 208. The first portion stream 206 is transported to a heat exchanger 108 where it is cooled down prior to transporting it to the second absorber 104.

The first portion stream 206 comprises about 40 to about 60 wt % of the liquid stream 204 that is removed from the first absorber 102. In an exemplary embodiment, the first portion stream 206 comprises about 50 wt % of the liquid stream 204 that is removed from the first absorber 102. The second portion stream 208 comprises about 40 to about 60 wt % of the liquid stream 204 that is removed from the first absorber 102. In another exemplary embodiment, the second portion stream 208 comprises about 50 wt % of the liquid stream 204 that is removed from the first absorber 102.

The second portion stream 208 is then transported to the blender 116, where it is blended with a stream 218 that emanates from the second absorber 104 to form a rich sol stream 220 that is transported to the regenerator. The regenerator heats the rich sol stream 220 to release carbon dioxide from the ammonium bicarbonate. The carbon dioxide is removed from the ammoniated solution in the regenerator and is sent for sequestration, while ammonia is recycled to the first absorber in the form of the ammoniated solution 202.

The first portion stream 206 is transported to the second absorber 104 via a second heat exchanger 108, where it is cooled down to a temperature of about 10 to about 15 degrees Centigrade. In an exemplary embodiment, the first portion stream 206 is cooled down to a temperature of about 13 degrees Centigrade.

A semi-lean gaseous stream 210 that emanates from the top of the first absorber 102 is transported to the second absorber 104. In one embodiment, the gaseous stream 210 comprises substantially nitrogen, oxygen, argon, and water, with a significant amount of ammonia and a small portion of carbon dioxide. In an exemplary embodiment, the gaseous stream 210 comprises about 3 to about 8 wt % gaseous ammonia and about 2 to about 5 wt % carbon dioxide with the balance consisting of nitrogen, oxygen, argon, and gaseous water.

As noted above, the second absorber 104 functions to extract carbon dioxide from the liquid stream 206 and from the gaseous stream 210. It also functions to remove ammonia and to recycle it back to the first absorber 102. The second absorber thus operates at a high carbon dioxide feed loading and at temperatures of 5 to about 35 degrees Celsius for bulk ammonia capture of ammonia that emanates from the first absorber 102. The second absorber operates on the principle that the ammonia slip is a stronger function of carbon dioxide loading than that of the liquid feed temperature.

The liquid stream 206 is introduced through the top of the second absorber 104 and flows downwards. The gaseous stream 210 is introduced at the bottom of the second absorber 104 and flows upwards.

The second absorber 104 can have about 25 to about 50 stages. In one embodiment, the second absorber 104 can have about 30 to about 40 stages. In an exemplary embodiment, the second absorber 104 can have about 35 stages.

Figure 4:
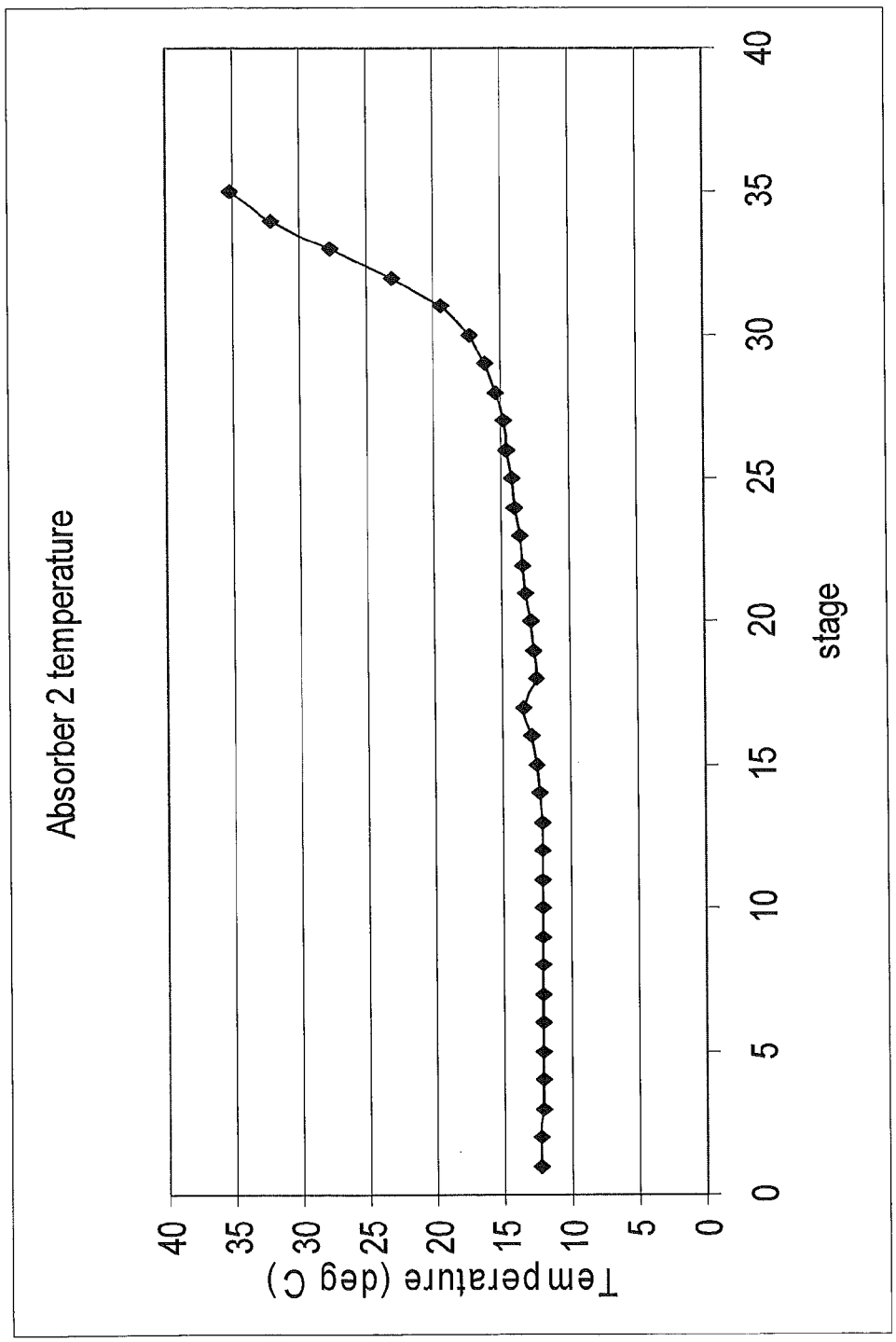
FIG. 4 is a graphical representation of the temperature profile of the second absorber.
Figure 5:
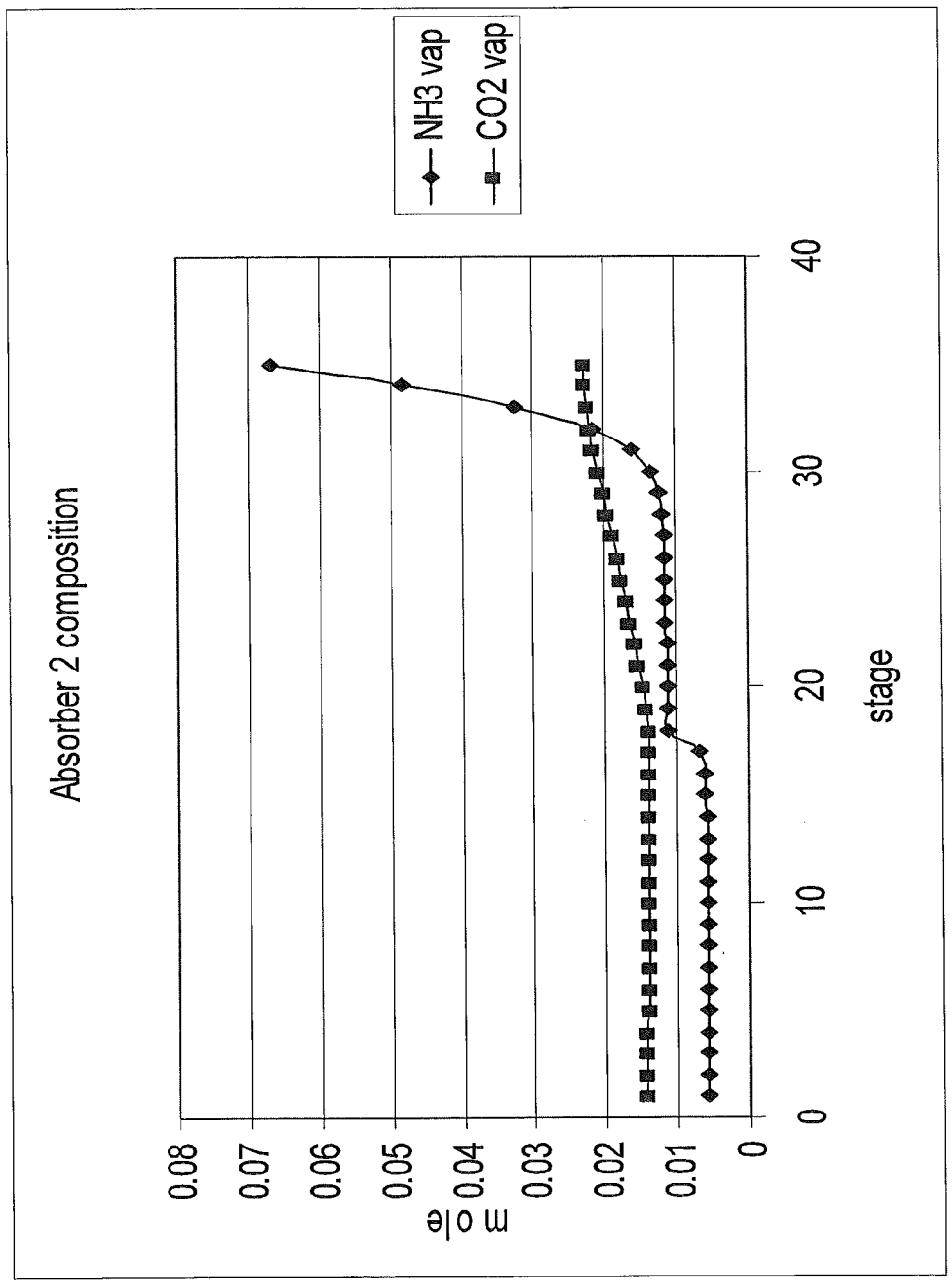
FIG. 5 is a graphical representation of the composition profile of the second absorber.

FIGS. 4 and 5 depict embodiments of the temperature and composition profiles in an exemplary second absorber 104 respectively. From the FIG. 4, it may be seen that stage 1 (near the top of the second absorber 104) has a temperature that is lower than the stage 35 (near the bottom of the second absorber 104). Stage 1 has a temperature of about 12 degrees Celsius, while stage 35 has a temperature of about 35 degrees Celsius. From the FIG. 5, it may be seen it may be seen that in the second absorber 104, the carbon dioxide and ammonia concentration at stage 1 (near the top of the second absorber 104) is extremely low, while the ammonia concentration in vapor form increases significantly towards the bottom (stage 35) of the second absorber.

The stream 212 emanating from the second absorber 104 is therefore rich in ammonia. The stream 212 is split into three streams 214, 216 and 218 in a splitter 118. The stream 212 emanating from the second absorber comprises about 4.5 to about 24 wt % ammonia. The stream 212 has a temperature of about 30 to about 40 degrees Celsius. In an exemplary embodiment, the stream 212 has a temperature of about 35 degrees Celsius.

Stream 214 that emerges from the splitter comprises about 30 to about 50 wt % of the total weight of stream 212. Stream 214 is recycled to the second absorber 104. Stream 214 contacts a second heat exchanger 112 that reduces its temperature to about 10 to about 15 degrees Celsius from about 35 degrees Celsius. This stream 214 recirculates liquid through the bottom portion of absorber 2 to provide additional contact time of the liquid with the flue gas to ensure capture of the ammonia from absorber 1.

Stream 216 comprising about 35 to about 45 wt % of the total weight of stream 212 is recycled back to the first absorber 102 via a third heat exchanger 110. The third heat exchanger 110 serves to reduce the temperature of stream 216 to about 20 to 30 degrees Celsius from 35 degrees Celsius. In one embodiment, the temperature of stream 216 prior to entering the first absorber 102 is adjusted to about 25 degrees Celsius.

Stream 218 comprises about 0 to about 25 wt % of the stream 212 and is transported to the blender 116 to form a part of the rich sol stream 220 that is transported to the regenerator for extraction of carbon dioxide. As noted above, the carbon dioxide that is extracted at the regenerator is sequestered. Ammonia that is recovered from the regenerator is transported (recycled) back to the ammoniated solution 202 (also termed the lean sol).

The process employed by the system 100 has many advantages over other comparative processes. The use of higher temperatures in the first absorber 102 permits the use of reduced circulation rates when compared with other comparative processes that operate at temperatures of less than 20 degrees Celsius. In one embodiment, the use of first absorber temperatures of 25 to about 45 degrees Celsius facilitates the use of a system with a reduced circulation rate on the order of about 3 to about 5 grams of ammoniated solution per gram of carbon dioxide gas. This results in a reduction in the liquid loading, which facilitates a reduction in absorber diameter, which leads to a reduction in capital costs, operating costs and maintenance costs.

In one embodiment, in processes where the first absorber 102 operates at temperatures of less than 20 degrees Celsius, 10 grams of ammonia is used to absorb 1 gram of carbon dioxide from the flue gas stream. In the present method, by operating the first absorber 102 at elevated temperatures of 25 to about 45 degrees Celsius, about 1.5 to about 3.5 grams of ammonia may be used to absorb 1 gram of carbon dioxide from the flue gas stream. In an exemplary embodiment, about 2.0 to about 2.5 grams of ammonia may be used to absorb 1 gram of carbon dioxide from the flue gas stream.

The use of elevated temperatures in the first absorber 102 thus results in a reduction of about 70 to about 90 wt % in the amount of ammonia used to extract carbon dioxide from the flue gas stream. In one embodiment, the use of elevated temperatures in the first absorber 102 thus results in a reduction of about 75 to about 85 wt % in the amount of ammonia used to extract carbon dioxide from the flue gas stream.

The use of elevated temperatures in the first absorber 102 also facilitates the use of cooling water for cooling the flue gases prior to entry into the first absorber 102. This reduces chiller (not shown) duty requirements which will save both capital cost and electrical power in terms of smaller chiller units.

The use of elevated temperatures also facilitates a reduction in absorber diameter and facilitates the elimination of a recirculating pump. This results in lower capital costs and in lower process costs as well.

While the invention has been described in detail in connection with a number of embodiments, the invention is not limited to such disclosed embodiments. Rather, the invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method comprising:
    contacting a flue gas stream with an ammoniated solution within a first absorber; wherein the first absorber operates at a temperature of about 25 to about 50 degrees Celsius; the ammoniated solution being operative to remove carbon dioxide from the flue gas stream to form a liquid stream that comprises ammonia and about 2 to about 31 weight percent carbon dioxide, based on the total weight of the liquid stream and a gaseous stream that comprises about 3 to about 8 wt % gaseous ammonia and about 2 to about 5 wt % carbon dioxide;
    splitting the liquid stream into a first portion stream and a second portion stream;
    transporting the gaseous stream and the first portion stream to a second absorber; wherein the second absorber operates at a temperature of about 5 to about 35 degrees Celsius; the second absorber being operative to remove substantially all ammonia from the gaseous stream and the first portion stream and form a stream rich in ammonia;
    recycling at least a portion of the stream rich in ammonia from the second absorber to the first absorber;
    transporting the second portion stream of the liquid stream to a regenerator to separate carbon dioxide from ammonia; and
    splitting the stream rich in ammonia that emanates from the second absorber into three separate streams, one of which is recycled to the second absorber and one of which is blended with the second portion stream of the liquid stream.

2. The method of claim 1, where the ammoniated solution is at a temperature of about 30 to about 50 degrees Celsius.

3. The method of claim 1, where the ammoniated solution is at a temperature of about 35 to about 45 degrees Celsius.

4. The method of claim 1, where the first absorber comprises an interstage cooler.

5. The method of claim 1, where the first absorber comprises about 40 to about 70 stages.

6. The method of claim 1, wherein the first portion stream is cooled prior to entering the second absorber.

7. The method of claim 1, wherein ammonia recovered from the regenerator is recycled to the first absorber.

8. The method of claim 1, wherein about 1.5 to about 3.5 grams of ammonia is used to absorb 1 gram of carbon dioxide from the flue gas stream.

9. The method of claim 1, wherein at least one stream from the second absorber is transported to the first absorber.

10. The method of claim 9, wherein the at least one stream transported to the first absorber is cooled in a heat exchanger.

* * * * *